US012488647B1

(12) United States Patent
Gruner et al.

(10) Patent No.: US 12,488,647 B1
(45) Date of Patent: Dec. 2, 2025

(54) LOW PROFILE APPARATUS FOR BALLOT TABULATION AND IMPRINTING OF UNIQUE IDENTIFIERS

(71) Applicant: Clear Ballot Group, Inc., Boston, MA (US)

(72) Inventors: Lucas Gruner, Boston, MA (US); Simon Jarvis, Middleton, MA (US); Adam Meunier, Cumberland, RI (US); Helen Michaud, Wakefield, MA (US); Michael Papa, Windham, NH (US); Savio Polini, Boston, MA (US); Charles Trowbridge, Boston, MA (US)

(73) Assignee: Clear Ballot Group, Inc., Nashua, NH (US)

( * ) Notice: Subject to any disclaimer, the term of this patent is extended or adjusted under 35 U.S.C. 154(b) by 0 days.

(21) Appl. No.: 18/943,379

(22) Filed: Nov. 11, 2024

(51) Int. Cl.
*G07C 13/02* (2006.01)

(52) U.S. Cl.
CPC .................................... *G07C 13/02* (2013.01)

(58) Field of Classification Search
CPC ....... G07C 13/00; G07C 13/005; G07C 13/02
USPC ................................ 235/51, 56, 386; 705/12
See application file for complete search history.

(56) References Cited

U.S. PATENT DOCUMENTS 5,216,438 A 6/1993 Nakao
5,883,043 A 3/1999 Halbrook, Jr.
6,759,366 B2 7/2004 Beckerdite
6,784,906 B2 8/2004 Long
7,166,558 B2 1/2007 Bhatt
7,589,752 B2 9/2009 Janning
8,096,471 B2 1/2012 Cummings
9,346,285 B2 5/2016 Rawlings
2003/0158775 A1 8/2003 Chaum
2004/0140357 A1* 7/2004 Cummings ............ G07C 13/00 235/386
2005/0247783 A1* 11/2005 Poulos .................. G07C 13/00 235/386

(Continued)

FOREIGN PATENT DOCUMENTS

CN 111348460 A 6/2020

OTHER PUBLICATIONS

"Voluntary Voting System Guidelines VVSG 2.0" Requirements for the Voluntary Voting System Guidelines 2.0, Prepared for the Election Assistance Commission, Feb. 10, 2021 (326 pages).

(Continued)

*Primary Examiner* — Suezu Ellis
(74) *Attorney, Agent, or Firm* — Klintworth & Rozenblat LLP

(57) ABSTRACT

Apparatus and method for implementing a low-profile tabulator. An example apparatus includes scanning optics and an imprinter positioned along a paper path. A ballot is scanned with the scanning optics to obtain a digital image of the ballot. A ballot approval input is received from a user, for example after the user has reviewed information representative of their selections. In response to the ballot approval, the imprinter imprints an identifier on the ballot, and data is stored that associates the identifier with the digital image of the ballot, e.g. by overlaying an image of the identifier on the digital image of the ballot. Example embodiments do not require the ballot to be re-scanned after the imprinting process, thus allowing a lower-profile form factor for the tabulator apparatus.

17 Claims, 8 Drawing Sheets

(56) References Cited

U.S. PATENT DOCUMENTS

| | | | | |
|---|---|---|---|---|
| 2008/0003039 | A1 | 1/2008 | Sekino | |
| 2009/0272838 | A1 | 11/2009 | Kaminaka | |
| 2010/0252628 | A1* | 10/2010 | Chung | G07C 13/00 235/386 |
| 2011/0017823 | A1* | 1/2011 | Baumert | G07C 13/00 235/386 |
| 2012/0061468 | A1* | 3/2012 | Arnao | G07C 13/00 235/386 |
| 2020/0027296 | A1* | 1/2020 | Hoover | G06F 21/645 |

OTHER PUBLICATIONS

Epson, "DS-30000/DS-32000 User's Guide", Epson America, Inc. [accessed Sep. 4, 2025] https://files.support.epson.com/docid/cpd5/cpd58205.pdf, 2021 (172 pages).

Brother Online User's Guide. 2019 "Clean the Scanner and Rollers" Brother Industries, Ltd. [accessed Sep. 4, 2025] https://support.brother.com/g/s/id/htmldoc/ads/cv_ds635/use/index.html?c=us&lang=en&prod=ds940dw_us_eu_as#GUID-A346A5A0-3FE9-402B-8284-5640033A38C9_99 (2 pages).

"Verity Print—on-Demand Ballot Printing—Check-in + on-Demand Printing" Hart InterCivic Inc., 2022, [accessed Sep. 4, 2025] https://www.hartintercivic.com/wp-content/uploads/2023/04/SB_VerityPrintwAutoBallot0223.pdf (2 pages).

"Verity Touch Writer—Accessible Ballot Marking—Equal Access + Vote" Hart InterCivic Inc., 2022, [accessed Sep. 4, 2025] https://www.hartintercivic.com/wp-content/uploads/2023/04/SB_VerityTouchWriter0223.pdf (2 pages).

"Verity Scan—Secure Vote Capture—Scan + Cast" Hart InterCivic Inc., 2022, [accessed Sep. 4, 2025] https://www.hartintercivic.com/wpcontent/uploads/2023/04/SB_VerityScan0223.pdf (2 pages).

"Verity Duo Standalone—Touchscreen Ballot Marking with a Verifiable Paper Trail" Hart InterCivic Inc., 2022, [accessed Sep. 4, 2025] https://www.hartintercivic.com/wp-content/uploads/2023/04/SB_VerityDuoStandalone_0223.pdf (2 pages).

* cited by examiner

LOW PROFILE APPARATUS FOR BALLOT TABULATION AND IMPRINTING OF UNIQUE IDENTIFIERS

BACKGROUND

The present disclosure relates to systems and methods for use in ballot tabulation. In particular, the disclosure relates to such systems and methods that may be implemented with the use of a relatively low-profile tabulation device that allows for more convenient transport, setup, and storage.

In the development of voting technologies, concerns of accessibility, accuracy, reliability, and auditability are of paramount importance. The Voluntary Voting System Guidelines (VVSG), and specifically the latest release, VVSG 2.0, provides a set of guidelines for voting systems to provide desired levels of functionality, accessibility, and security. Included in the VVSG 2.0 are guidelines for ensuring that an error or fault in the voting system software or hardware cannot cause an undetectable change in election results. According to one such guideline, paper ballots may be provided with a unique identifier that allows auditors to uniquely address individual ballots while the voter who cast the ballot remains anonymous. Aside from the goals of the VVSG 2.0, organizing elections also involves the challenges of transporting, setting up, operating, and taking down a large amount of equipment in a relatively short amount of time, and that equipment may need to be stored for much of the year. Thus, it is desirable to provide voting equipment that not only provides confidence in the outcome of an election, but that also employs technologies that simplify the logistical and operational aspects of implementing elections. Given the goal of providing election equipment that is capable of being used by different voters with different physical capabilities in different jurisdictions with different election regulations, it is particularly challenging to develop equipment capable of satisfying these different requirements while also having a compact form factor to simplify storage and transport.

SUMMARY

A method according to some embodiments comprises: receiving a marked ballot at a paper input of a scanning device; while the ballot is at least partially in the scanning device: scanning the ballot to obtain a digital image of the ballot; and receiving a ballot approval from a user. In response to the ballot approval, the method further includes: imprinting an identifier on the ballot; and storing data that associates the identifier with the digital image of the ballot.

An apparatus according to some embodiments comprises: scanning optics positioned along a paper path; an imprinter positioned along the paper path; and one or more processors. The one or more processors is/are configured to perform at least: scanning a ballot with the scanning optics to obtain a digital image of the ballot; receiving a ballot approval from a user; in response to the ballot approval from a user, imprinting an identifier on the ballot; and storing data that associates the identifier with the digital image of the ballot.

In some embodiments, after imprinting the identifier on the paper ballot, the ballot is released though a paper output of the scanning device.

In some embodiments, before receiving the ballot approval, information derived from the digital image of the ballot is provided to the user.

In some embodiments, the ballot is not rescanned after the identifier is imprinted on the ballot and before the ballot is released into a receptacle.

In some embodiments, providing information derived from the digital image of the ballot comprises displaying the digital image of the ballot on a screen.

In some embodiments, providing information derived from the digital image of the ballot comprises providing a visual or audio output of voter selections identified in the digital image.

In some embodiments, providing information derived from the digital image of the ballot comprises providing an indication of at least one of: an overvote, an undervote, a double vote, or a blank ballot.

In some embodiments, the ballot approval comprises a selection of a physical button, selection of a touch screen button, or a selection through an assistive input device.

In some embodiments, storing data that associates the identifier with the digital image of the ballot comprises overlaying an image of the identifier on the digital image of the ballot.

In some embodiments, storing data that associates the identifier with the digital image of the ballot comprises including the identifier in metadata (e.g. in a file name) of the digital image of the ballot.

In some embodiments, the scanning of the ballot begins while at least a portion of the ballot is outside of the paper input.

In some embodiments, the identifier is an alphanumeric value.

In some embodiments, the scanning device has a paper output and a paper path between the paper input and the paper output, and the paper path is shorter than a length of the ballot.

In some embodiments, the imprinter is positioned along the paper path between the scanning optics and the paper output.

BRIEF DESCRIPTION OF THE DRAWINGS

FIG. 1A further illustrates the position of a ballot 114 during optical scanning of the ballot.

FIG. 1B further illustrates the position of a ballot 114 during imprinting of an identifier on the ballot.

DETAILED DESCRIPTION

Figure 1A:
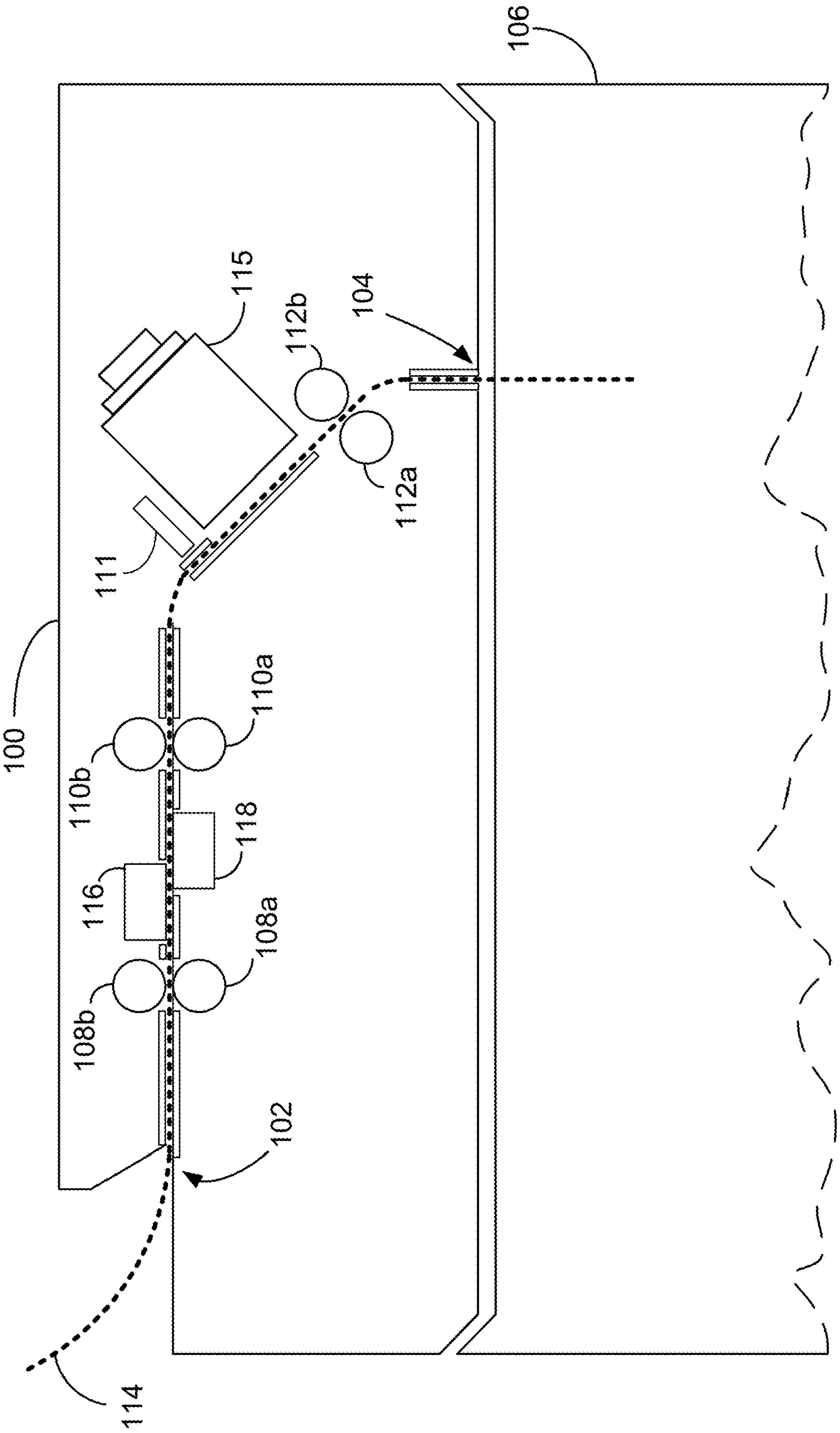
FIG. 1A is a schematic cross-sectional view of an example tabulator device according to some embodiments.

FIG. 1A is a schematic cross-sectional diagram of a low-profile ballot tabulator 100 according to an example embodiment. The tabulator includes a paper input slot 102 for accepting a paper ballot and a paper output slot 104 from which the ballot may be released to be deposited into a receptacle 106, which is shown only in part in FIG. 1A. An example paper ballot 114 in the tabulator 100 is illustrated as a thick dotted line. Ballot 114 may be a full-face ballot. A paper feeding mechanism is provided along a paper path between the input slot 102 and the output slot 104. In the particular example of FIGS. 1A-1B, the paper feeding mechanism is implemented using pairs of rollers 108*a-b*, 110*a-b*, and 112*a-b*. One or more of those rollers may be driven by a motor (not shown). Other rollers may not be driven by any mechanism but may be used to facilitate the movement of the ballot 114 through the paper path. In other embodiments, different paper feeding mechanisms may be used.

Image scanning optics (e.g. one or more scan heads) are also provided along the paper path. In the embodiment shown in FIG. 1A, the image scanning optics include first scanner optics 116 positioned to scan a first face of the ballot and second scanner optics 118 positioned to scan a second, opposite face of the ballot. In the example of FIG. 1A, the ballot 114 is illustrated in a position where a portion thereof is being scanned by the scanner optics 116, 118. The image scanning optics are not limited to the use of any particular scanning technique. However, in an example embodiment, the image scanning optics cover only a portion of the length of the ballot, an image of the complete ballot being generated by transporting the ballot past the image scanning optics. Some embodiments may include image scanning optics capable of scanning only one face of a ballot. The scanning optics may include, for example, one or more CCD (charge-coupled device) sensors.

Figure 1B:
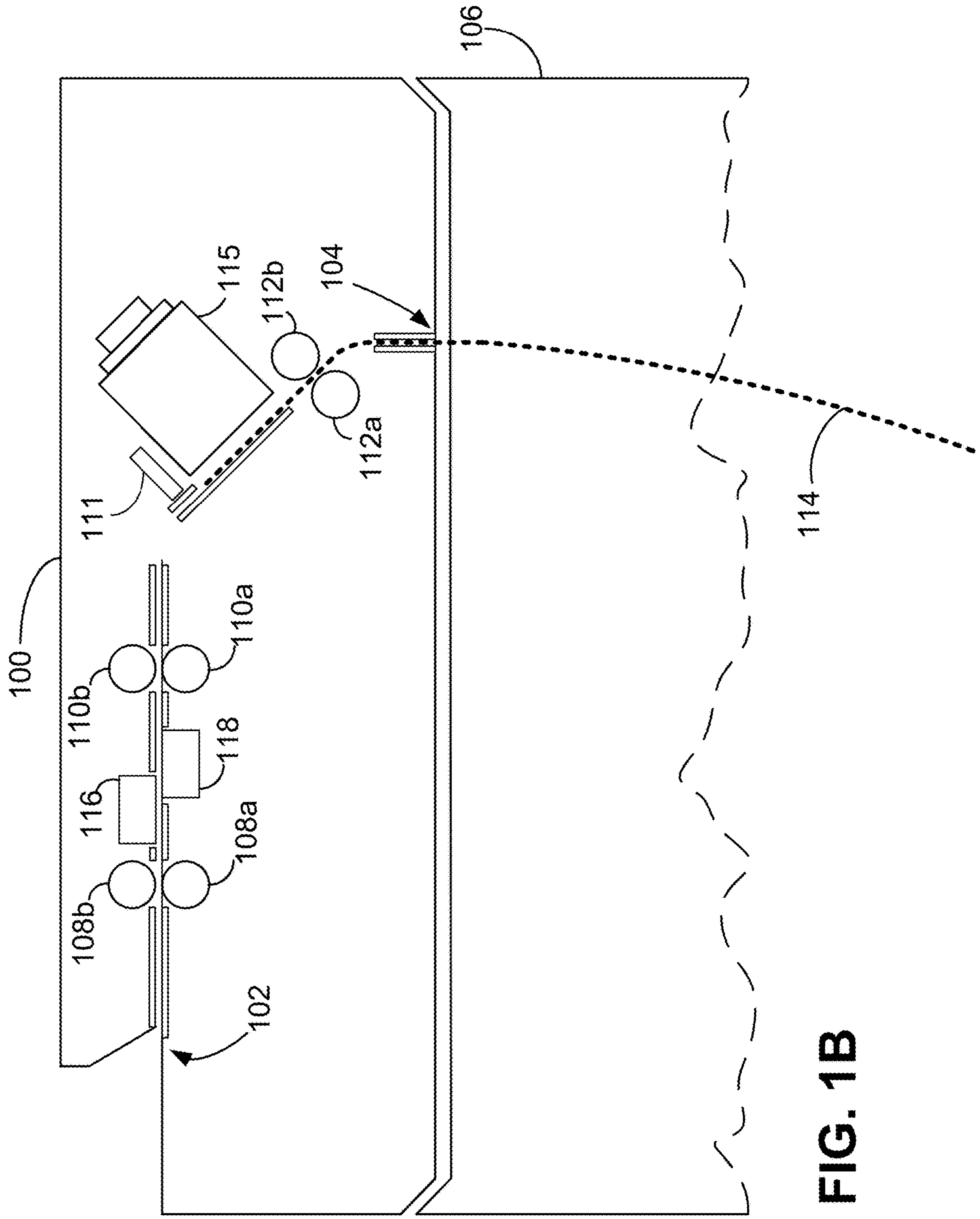
FIG. 1B is a schematic cross-sectional view of an example tabulator device according to some embodiments.

The low-profile tabulator 100 of FIG. 1A also includes an imprinter 115. The imprinter is capable of imprinting a visible identifier on the ballot 114. The identifier may be, for example, a unique alphanumeric identifier to facilitate auditing of the ballots collected in an election. The imprinter may use, for example, inkjet, laser, dot matrix, direct thermal, thermal transfer, or other printing technology. Embodiments using thermal transfer printing may provide the benefit in some embodiments of not drying out or otherwise losing efficacy during periods when the tabulator equipment is in storage (e.g. between elections). In addition, a thermal transfer imprinter is likely to be more stable during transportation of equipment to and from polling places, as there is no liquid ink that may spill or leak. The imprinted identifier may have a color other than black (e.g. magenta). In the embodiment of FIGS. 1A-1B, the imprinter is positioned along the paper path between the scanning optics and the paper output. Conversely, the scanning optics are positioned along the paper path between the paper input and the imprinter. In some embodiments, there are no scanning optics between the imprinter and the paper output.

The low-profile tabulator 100 of FIG. 1A further includes a paper presence detector 111 positioned between the scanner optics and the imprinter. In some embodiments, the imprinter imprints an identifier on a ballot only after the paper presence detector 111 senses that the ballot is no longer positioned at the paper presence detector 111. Such embodiments ensure that the imprinting of the identifier is performed on the trailing edge of the ballot in an area that is not used for recording the voter's selections. Additional paper presence detectors may also be provided. For example, one such detector may be provided immediately inside the paper input slot 102 to detect when a ballot is being inserted. A paper presence detector may also be provided between the imprinter 115 and the output slot 104. These and/or other paper presence detectors may be used to assist with the ordinary operation of the tabulator and/or to detect fault conditions such as a paper jam.

FIG. 1B illustrates the low-profile tabulator 100 of FIG. 1A, except the ballot 114 has moved beyond the paper presence detector 111 and thus is now in a position at which the imprinter 115 may be used to print a visible identifier onto the ballot (in this case, on the trailing edge of the ballot).

Figure 2A:
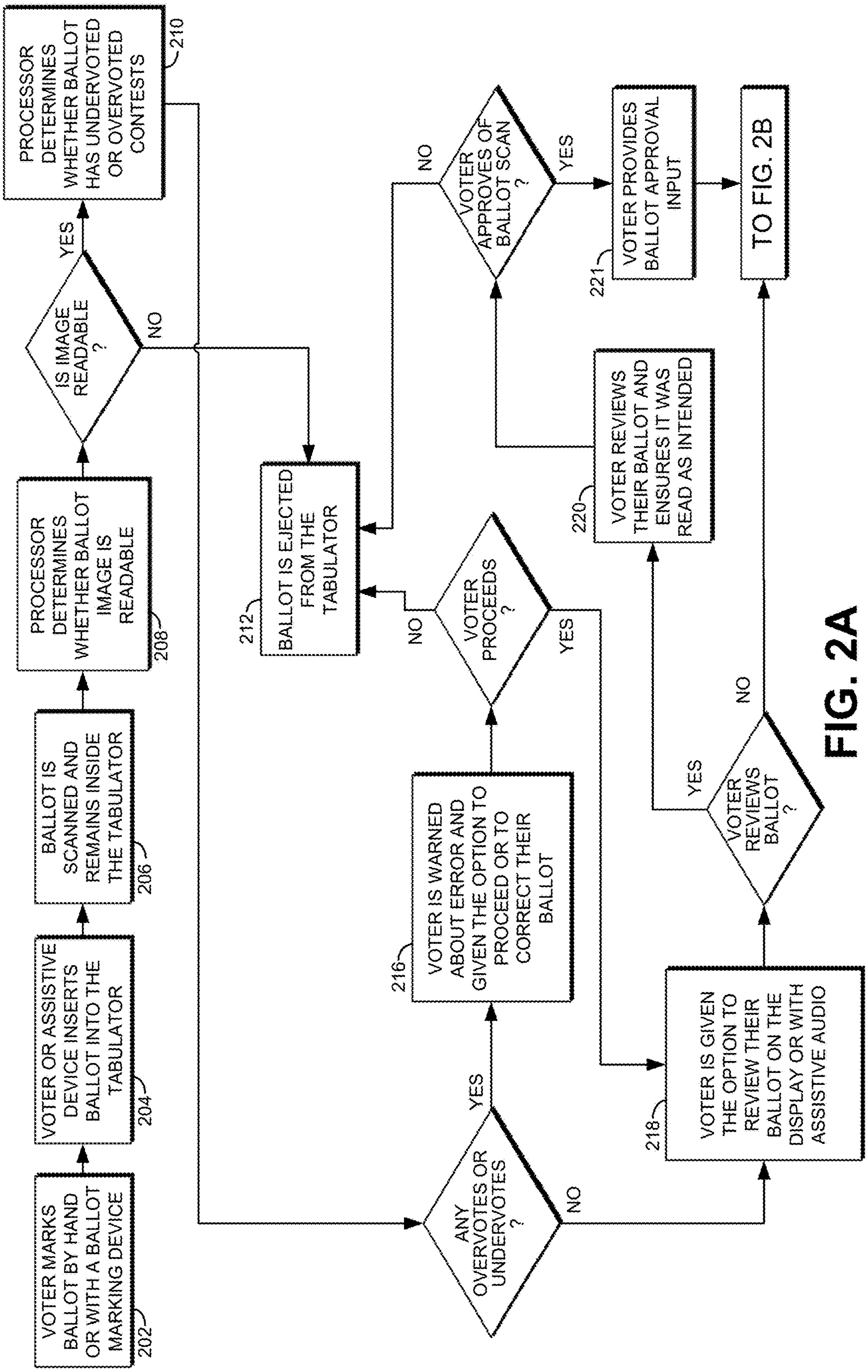
FIGS. 2A-2B provide a flow chart illustrating a method performed in some embodiments.
Figure 2B:
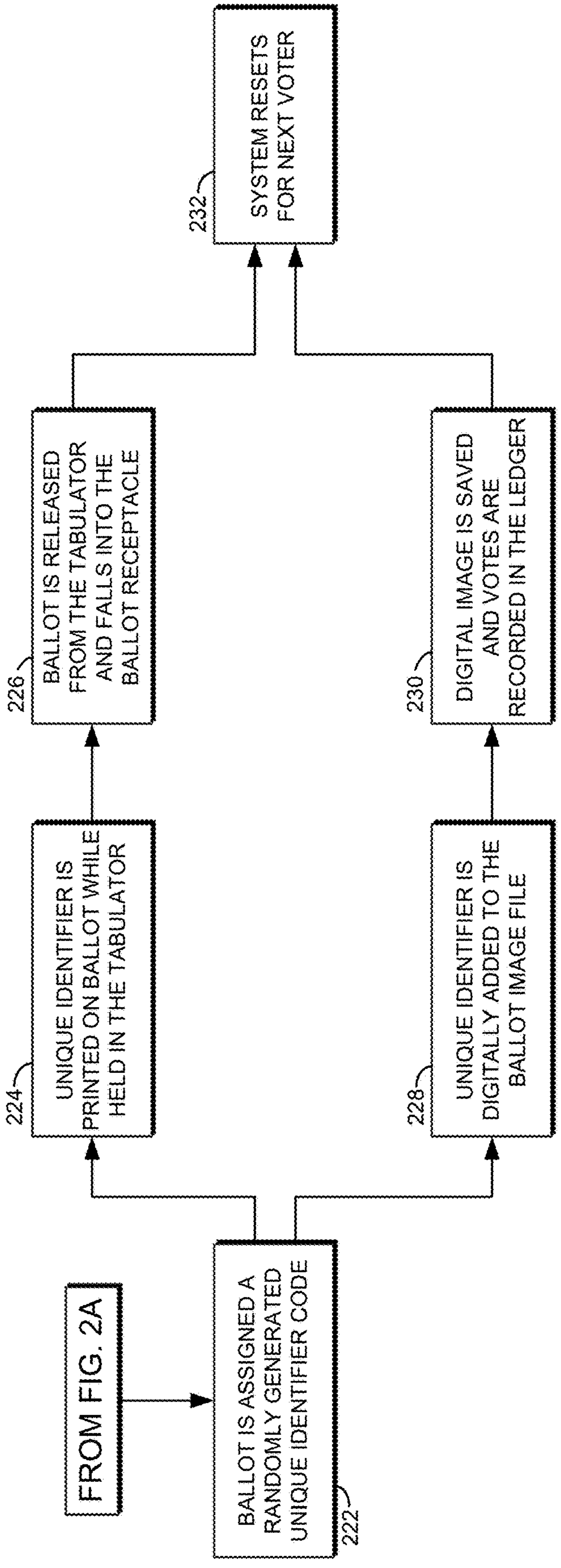

An example method as performed by a low-profile tabulator, such as tabulator 100, is illustrated by the flow diagram of FIGS. 2A-2B.

As shown in FIG. 2A, a paper ballot is marked (202) by hand or with a ballot marking device. The ballot is inserted (204) into a paper input portion of a tabulator (or scanner portion of a tabulator). The ballot is scanned (206) to obtain one or more digital images of the ballot (e.g. an image of each face of the ballot). A processor operates (208) to determine whether the ballot image(s) is/are readable. If not, the ballot is ejected (212) from the tabulator. The ejection of the ballot may be performed by driving the ballot backward, out through the paper input. Various actions may be performed after a ballot has been ejected according to election protocols. For example, in the case of an unreadable ballot, the voter may be provided with a replacement ballot on which to re-mark their selections (e.g. at 202).

If the ballot image is readable, the processor interprets the selections made on the ballot and determines (210) whether the ballot has any undervoted or overvoted contests. If the ballot does include an undervoted or overvoted contest (or any similar issue that may call for alerting the voter, such as a double vote), the voter is warned (216) about the issue and given the option to proceed with the ballot as marked or to correct the ballot. If the voter does not wish to proceed with the ballot as marked, then the ballot is ejected (212) from the tabulator allowing it to be corrected or replaced. The ejection of the ballot may occur through the same aperture (e.g. through paper input 102) into which the ballot was inserted into the tabulator. The ejection of the ballot may be carried out by the paper feeding mechanism of the tabulator.

If the voter wishes to proceed despite the presence of an undervote or overvote (or similar issue), or if no such issue was detected, the voter is given the option (218) to review information derived from the scanned image of their ballot to determine whether the ballot has been correctly interpreted by the processor. (In some embodiments, this option of whether the voter wishes to review the information after scanning is presented before the ballot is inserted.) The voter's review of the ballot (220) may be performed using a display (e.g. a display screen of the tabulator) or using assistive audio. The review may include indicating (visibly or audibly), for each contest on a ballot, the selection (or selections) that the processor has determined were made on the ballot. If the voter does not approve of the interpretation of the ballot, then the ballot is ejected (212) from the tabulator as described above, allowing it to be corrected or replaced. If the voter does approve of the interpretation of the ballot, the voter may provide a ballot approval input (221), which may involve, for example, a user selection of a physical button, a user selection of a touch screen button, or a selection through an assistive input device, such as a sip and/or a puff selection input. If the voter approves the ballot (either after review or after skipping the option to review the ballot), then processing continues as shown in FIG. 2B. The ballot approval input may be an input provided by the voter to officially cast the ballot, after which the voter is not provided with any further opportunity to revise or review their selections.

As illustrated in FIG. 2B, a unique identifier code is assigned (222) to the approved ballot. In some embodiments, the ballot is assigned a unique identifier that is selected randomly or pseudo-randomly. The random identifier may be selected in such a way as to avoid duplicating of identifiers, e.g. by selecting identifiers from a predetermined list of identifiers but randomizing the order in which the identifiers are used. The use of random identifiers helps to protect the anonymity of the ballot because the order in which people vote may be visible to the public, and randomizing the identifiers prevents an observer from inferring the identifier of a voter's ballot based on the voting order. In some embodiments, e.g. where the tabulator is processing ballots that have been sufficiently anonymized (e.g. shuffled and/or blended with other ballots) before being scanned, the ballot may be assigned a sequentially selected identifier code. In some embodiments, the unique identifier is an alphanumeric identifier. In some embodiments, the unique identifier is unique at least among identifiers assigned to ballots by a particular tabulator apparatus in a particular election.

In some embodiments, the identifier code includes an identifier of the tabulator apparatus. In an election, several tabulator apparatuses may be in use, these tabulation devices are not networked and thus cannot share real-time information to facilitate the generation of unique identifiers across the devices. In example embodiments, some digits of the identifier represent a compressed form of the serial number of the associated tabulator, and some of the digits represent a randomly generated number. For example, six alphanumeric characters may be used for the tabulator serial number and an additional six alphanumeric characters may be used for a randomly generated sequence of characters. In an embodiment using base-36, each set of six digits allows for 2.2 billion machine serial numbers and 2.2 billion random numbers. In an embodiment using base-64, each set of six digits allow for 68.7 billion machine serial numbers and 66.7 billion random numbers. Given the large space of available numbers, the chances of any two identifiers overlapping in a given election is astronomically low.

In some embodiments, as an alternative or in addition to the use of a unique identifier, the imprinter applies a stamp, symbol, message, or other information as an indication that the ballot has been counted or otherwise processed (e.g. the word "voted" in the case of a tabulated ballot in an election, or the words "test ballot" in the case of a pre-election system check).

Further ballot processing may be performed on both the paper ballot and the digital image of the ballot resulting from the original scan. In the processing of the image file, the identifier code is digitally added (228) to a file representing the ballot image, for example by applying the identifier code as an overlay on the ballot image and/or by including the identifier code in metadata of the image file such as in an Exif (Exchangeable image file format) header of the image file. In some embodiments, the identifier code may be included in a file name of the image file. In some embodiments, some or all of the position, size, font, color, and/or other properties of the overlay may approximate the properties of the imprinted identifier, but different position, size, font, color, and/or other properties may be used for the overlay in other embodiments. The ballot image may be stored in any available image format, such as JPEG, GIF, PDF, TIFF, PNG, and the like, and the application of the overlay may be performed using any available image processing software. The digital image of the ballot is stored, and the votes represented by the ballot are recorded (230).

In the processing of the paper ballot, the identifier code is printed (224) on the ballot while the ballot is still held by the tabulator. For example, the identifier code may be printed on the ballot by an imprinter such as imprinter 115 of FIGS. 1A-1B. In some embodiments, the tabulator holds the ballot in place for a predetermined amount of time (e.g. three seconds) to allow ink (or other medium) to dry, solidify, resolve, or cure and avoid spreading wet ink or other medium distortion through the mechanism, or compromising the identifier. After printing of the identifier code on the ballot, the ballot is released (226) from the tabulator, e.g. through the paper output 104. To release the ballot, the paper feeding mechanism may drive the ballot out through the output slot 104 into the receptacle 106. In example embodiments, there is no re-scanning of the ballot after the printing of the identifier. This configuration helps to protect the anonymity of the ballot with the use of a low-profile tabulator because re-scanning could, absent bulky paper handling apparatus, allow the identifier to be visible to an observer during the re-scanning process (e.g. if the ballot were partially ejected for re-scanning as shown in the configuration of FIG. 1A). In addition, re-scanning of the ballot immediately after imprinting of an identifier could cause the spreading of ink throughout the imprinting apparatus as the freshly-imprinted ballot is moved in different directions through the paper path of the tabulator, potentially fouling the rollers and/or the scanning optics. In addition, an order of operation in which scanning is performed before imprinting ensures that the imprinting does not affect the interpretation of the scanned ballot.

After the ballot is deposited in the receptacle, the tabulator may then be reset (232) for processing of the next ballot from the next voter.

Figure 6A:
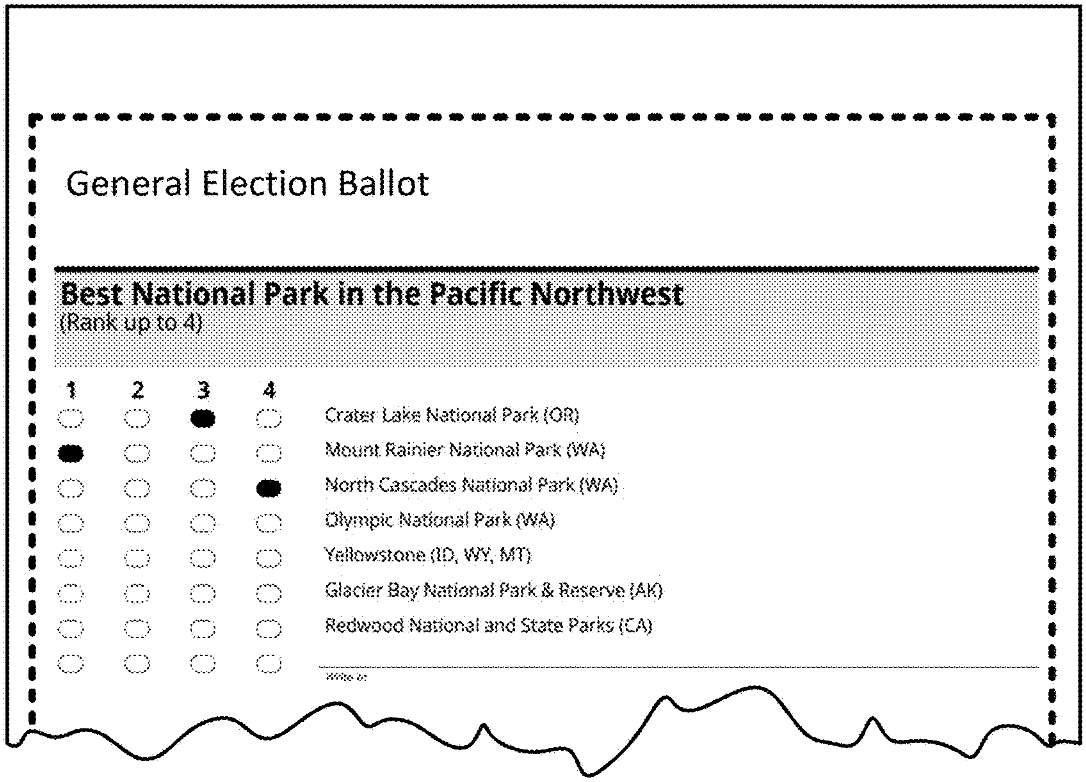
FIG. 6A is a schematic illustration of a portion of a ballot as scanned according to some embodiments.
Figure 6B:
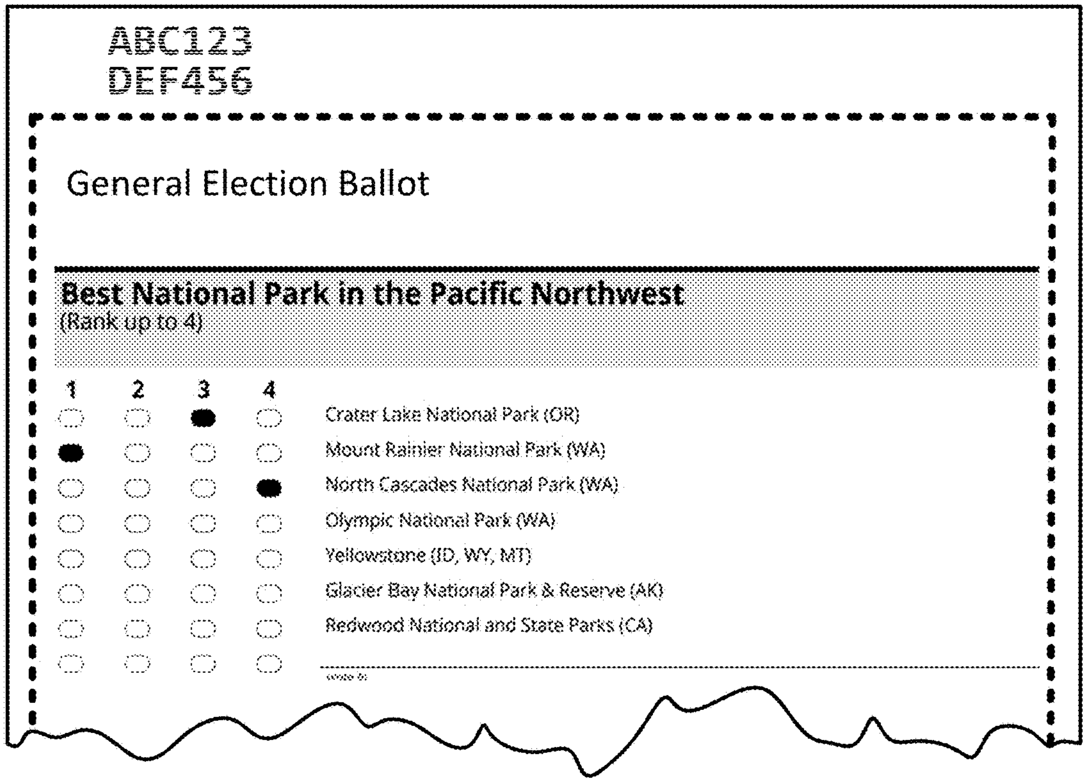
FIG. 6B is a schematic illustration of the ballot of FIG. 6A after the imprinting of an identifier on the ballot.

A schematic illustration of a portion of a paper ballot is illustrated in FIG. 6A. The ballot of FIG. 6A appears as it would appear during scanning of the ballot image (or images) before the unique identifier has been imprinted on the ballot. FIG. 6B illustrates the ballot of FIG. 6A after the unique identifier (in this case, the identifier includes both "ABC123" on one line followed by "DEF456" on the next line) has been imprinted on the trailing edge of the ballot. In example embodiments, the ballot is not re-scanned after it has been imprinted and before it has been released from the paper output into the receptacle. (The imprinted ballot may, however, be scanned during later processing, e.g. at a central ballot processing facility, after it and other ballots have been collected in the receptacle.) Example embodiments allow for processing of ballots that are inserted in any one of various orientations. For example, the scanner optics 116, 118 may scan both sides of a ballot to capture an appropriate ballot image regardless of whether the ballot was inserted face-up or face-down. The imprinter 115 may imprint the trailing edge of the ballot regardless of the orientation with which the ballot was inserted.

Example embodiments as described herein allow for a low-profile tabulator that satisfies other requirements for establishing confidence in an election result. A conventional solution to providing ballots marked with an identifier code would involve the identifier code being printed on the paper ballot before the ballot is scanned as a digital image, because this results in the physically printed identifier code being visible in the digital image. However, such a process could result in an identifier code being imprinted on a ballot that is not ultimately approved by the voter (e.g. the voter has requested return of the ballot to make a modification or correction). Such imprinting of identifiers on ballots that the voter has not yet approved could cause confusion or ambiguity during voting or during an audit. Similarly, in the case of a paper jam or other mechanical issue, the presence of an identifier code on a ballot provides confirmation that the ballot was successfully tabulated before the issue occurred. Conversely, the absence of an identifier code provides an indication that the ballot has not yet been tabulated.

A solution to this issue could hypothetically be implemented by re-scanning the ballot after the identifier code has been printed on the ballot, resulting in a first scan, followed by voter approval, then imprinting of an identifier, and subsequently a second scan. However, such a solution would give rise to other technical problems. For example, to perform the second scan after imprinting, the paper ballot would need to be driven past the scanning optics (e.g. 116, 118) a second time. However, for the following reason, such a process would call for a long paper path or complicated diverter or hands-free adapter systems, requiring a bulky tabulator apparatus: absent such features, the second scan would result in the ballot being at least partially ejected through the input slot 102, which a voter or election worker is likely to misinterpret as an automated rejection of the ballot. (As described in FIGS. 2A-2B, all other cases that result in the ballot being fed out of the input slot result from voting errors or ballot reading errors.) As a result, the voter may attempt to manually withdraw their ballot, thus corrupting the scanning and tabulating process. In addition, partial ejection of the ballot could expose the identifier code to other observers while the voter is using the tabulator, thus compromising the anonymity of the ballot.

Figure 3:
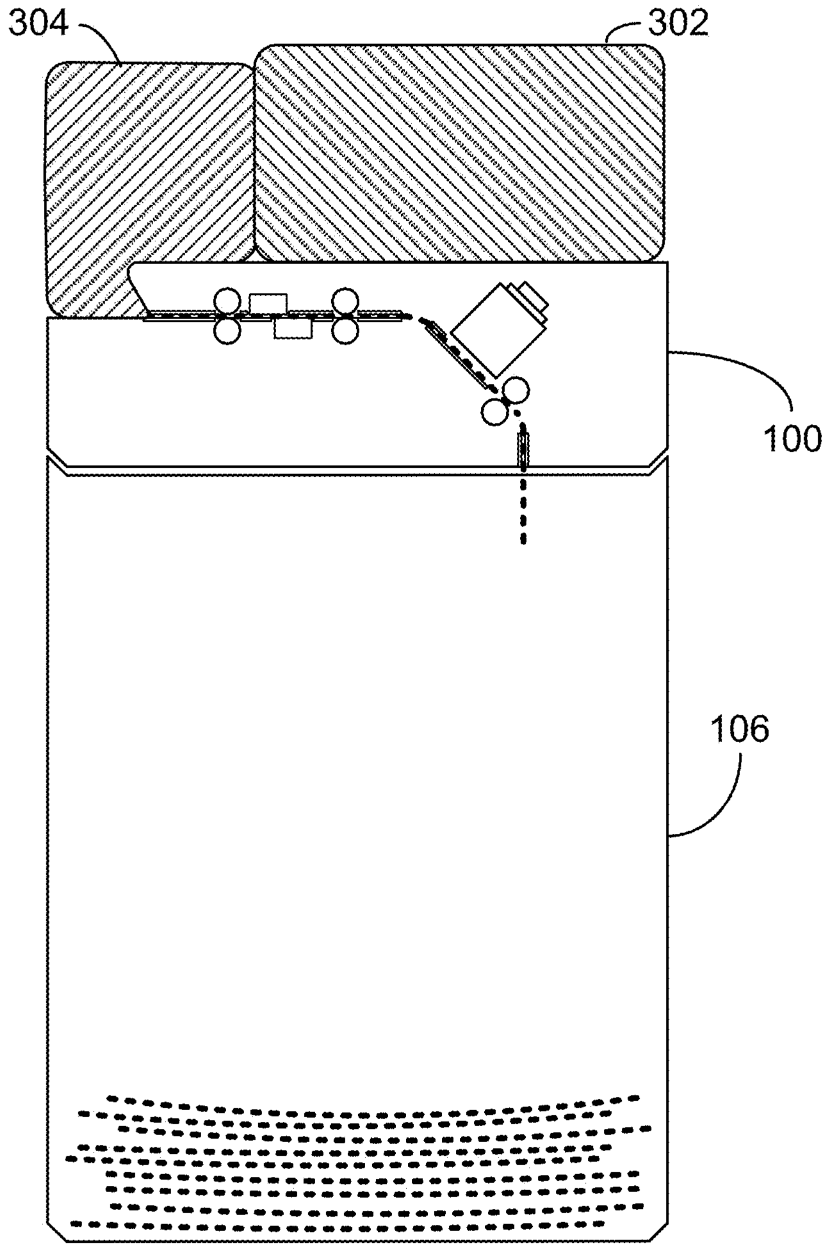
FIG. 3 is a schematic cross-sectional view of a system including a tabulator device according to some embodiments.

Additional issues with post-imprinting scanning could arise in the case of a tabulator coupled with a printer of a ballot marking device (which may be used, for example, to provide enhanced access to voters with difficulties completing a paper ballot). The printer may not be readily adaptable to a reverse paper flow resulting from a tabulator attempting to perform a second scan by partially ejecting the ballot. In some embodiments, as illustrated in FIG. 3, a tabulator such as tabulator 100 may be coupled with a printer 302 through a hands-free adapter 304.

Conversely, example embodiments with the tabulator apparatus and methods as described herein overcome these issues while allowing for the use of a relatively low-profile tabulator apparatus that is more convenient to transport, set up, and store than a bulky tabulator that would otherwise be required. Some embodiments may be implemented with a paper path through the tabulator that is shorter than the length of the ballot itself. In some embodiments, the length of the paper path from the paper input 102 to the paper output 104 is less than 350 mm. In some embodiments, the length of the paper path is less than 300 mm. In some embodiments, the length of the paper path is less than 250 mm. In some embodiments, the paper path may be measured between the first set of drive rollers (108*a*, 108*b*) and the last set of drive rollers (112*a*, 112*b*).

The use of embodiments as described herein result in a relatively short paper path that in turn allows for the construction of a relatively low-profile tabulator device that is easier to store and transport. In addition, the use of a relatively short paper path helps to limit the chances of a paper jam, and, in case a paper jam does occur, it simplifies the clearing of the paper path. For example, in some embodiments, the height of the tabulator is less than 200 mm. In some embodiments, the height of the tabulator is less than 150 mm. In some embodiments, the height of the tabulator is less than 125 mm. The height of the tabulator in some embodiments excludes the height of any foldable or removable components, such as for example a foldable display on the tabulator.

Some embodiments may be implemented without the use of any paper diverter or hands-free adapter. In some embodiments, the movement of the paper ballot through the tabulator is unidirectional except where the ballot is being ejected, such that the ballot only moves from the paper input slot toward the paper output slot except in a case where the ballot is being returned to the voter. In some embodiments, the paper path is "one-way" in that the ballot moves unidirectionally from scanner through to the imprinter and into the ballot box receptacle. Thus, some embodiments provide no physical means to print on the ballot once the voter has verified, accepted, and irrevocably cast their ballot by providing a ballot approval input. For example, the ballot paper path does not go back through a printer after the ballot is cast by entry of the ballot approval input. In example embodiments, the only case where a ballot moves backward is in response to the voter rejecting their ballot; only in this case does the tabulator return the unaltered ballot to the voter.

Figure 4:
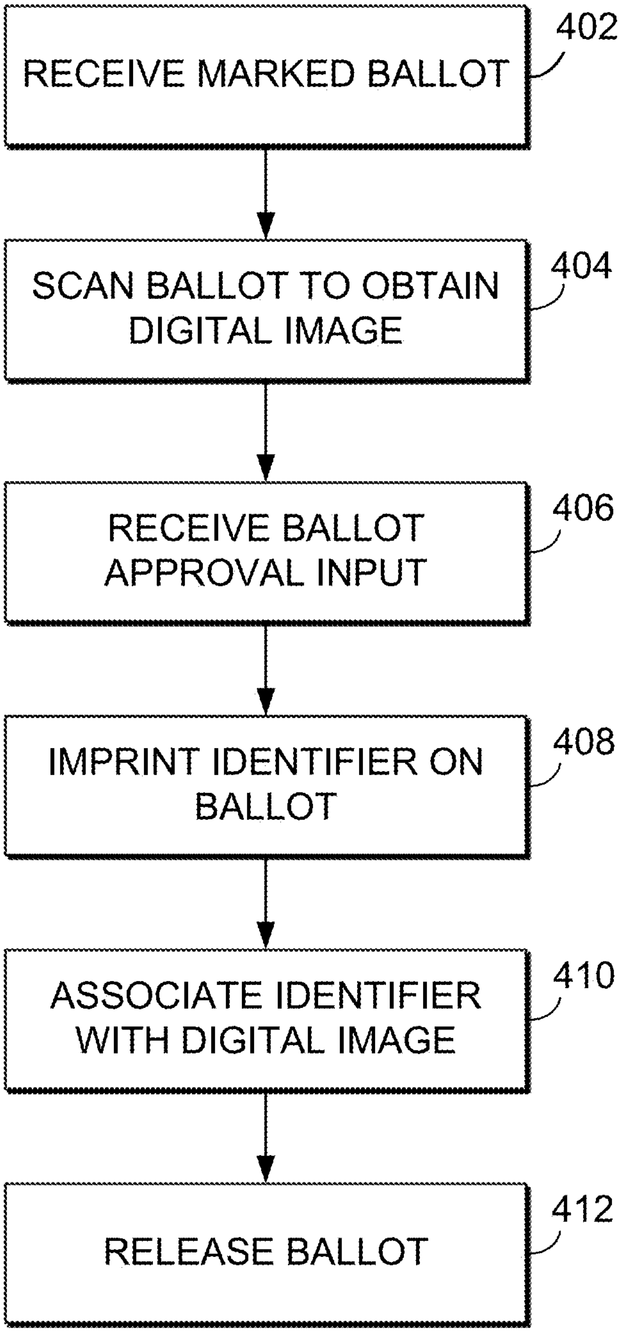
FIG. 4 is a flow diagram of a method performed in some embodiments.

As illustrated in the flow chart of FIG. 4, in an example method, a marked ballot is received (402) at a paper input of a scanning device. While the ballot is at least partially in the scanning device, the ballot is scanned (404) to obtain a digital image of the ballot. The scanning of the ballot may begin while at least a portion of the ballot remains outside of the paper input. In some embodiments, information derived from the digital image of the ballot is provided to the user. For example, a digital image of the ballot may be displayed on a screen. Alternatively or additionally, information indicating the selections on the ballot may be displayed on the screen and/or provided audibly to the user. In some embodiments, based on the digital image, an indication is provided to the user of a potential issue such as an overvote, an undervote, a double vote, and/or a blank ballot.

At 406, a ballot approval input is received from a user. The ballot approval may be provided in the form of, for example, a selection of a physical button, selection of a touch screen button, or a selection through an assistive input device, among other options. In response to the ballot approval, an identifier, such as a number, is imprinted (408) on the ballot. At 410, data is stored that associates the identifier with the digital image of the ballot. In some embodiments, this includes overlaying an image of the identifier on the digital image of the ballot. Alternatively or additionally, the identifier may be included in metadata of the digital image of the ballot.

At 412, after imprinting the identifier on the ballot, the ballot is released though a paper output of the scanning device. In some embodiments, the ballot is not scanned after the identifier is imprinted on the ballot and before the ballot is released into the receptacle.

Figure 5:
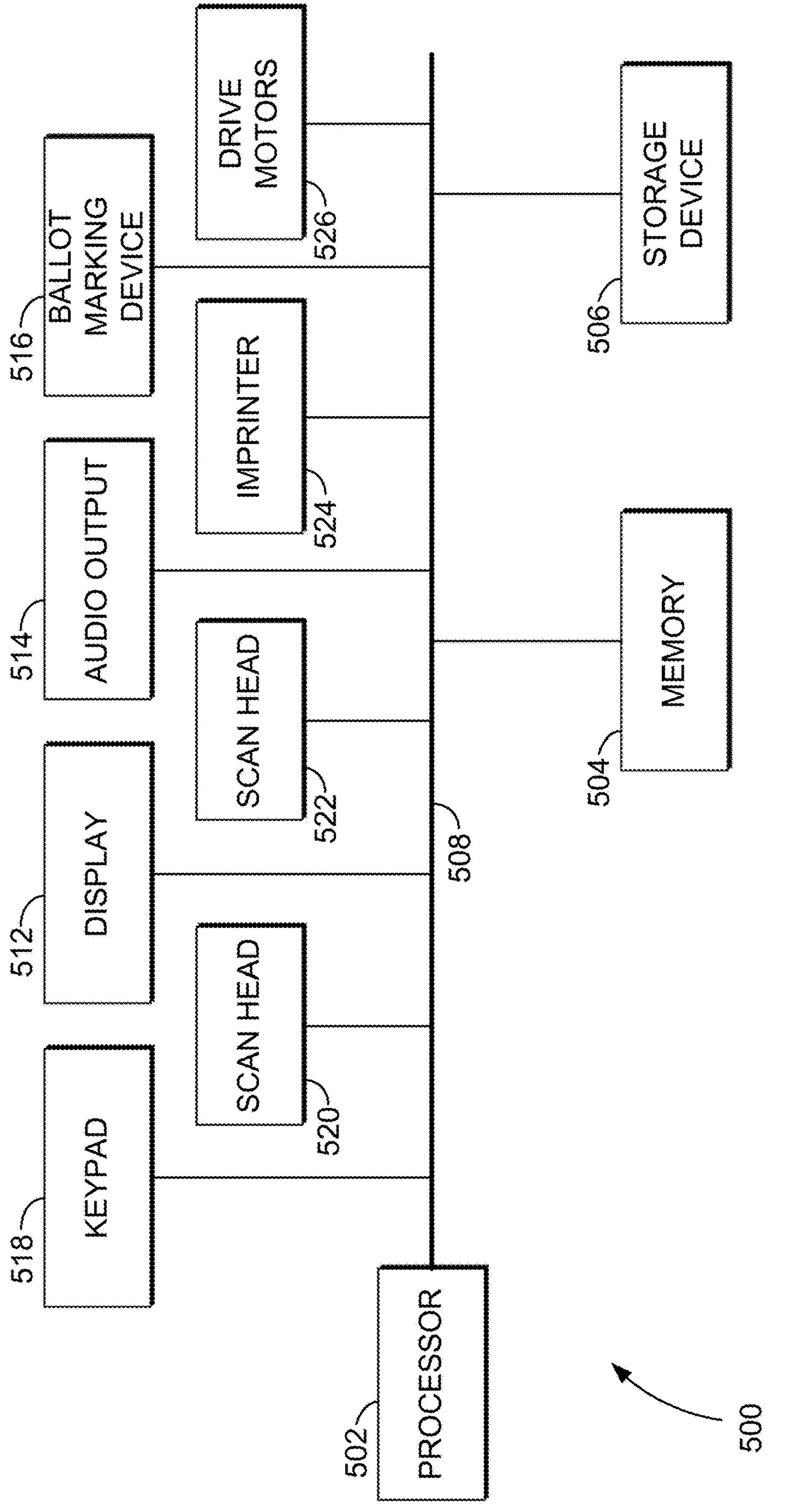
FIG. 5 is a functional block diagram illustrating components of an apparatus that may be used to implement some embodiments.

The methods as shown in FIGS. 2A-2B and FIG. 4 may be implemented with the use of a tabulator device as illustrated in FIGS. 1A-1B and/or FIG. 3. Such tabulator device may further include and/or be couplable with at least one processor configured to perform the methods described herein. FIG. 5 illustrates an example system 500 including a processor and associated peripheral and/or built-in devices that may be used as part of or associated with a tabulator system as described herein. System 500 can be embodied as a device including the various components described herein and is configured to perform one or more of the aspects described in this document. Elements of system 500, singly or in combination, can be embodied in a single integrated circuit (IC), multiple ICs, and/or discrete components. For example, in at least one embodiment, the processing elements of system 500 are distributed across multiple ICs and/or discrete components. In various embodiments, the system 500 is communicatively coupled to one or more other systems, or other electronic devices, via, for example, a communications bus or through dedicated input and/or output ports. In various embodiments, the system 500 is configured to implement one or more of the aspects described in this document.

The system 500 includes at least one processor 502 configured to execute instructions loaded therein for implementing, for example, the various aspects described in this document. Processor 502 can include embedded memory, input output interface, and various other circuitries as known in the art. The system 500 includes at least one memory 504 (e.g., a volatile memory device, and/or a non-volatile memory device). System 500 includes a storage device 506, such as an embedded MultiMediaCard (eMMC), which can include non-volatile memory and/or volatile memory, including, but not limited to, Electrically Erasable Programmable Read-Only Memory (EEPROM), Read-Only Memory (ROM), Programmable Read-Only Memory (PROM), Random Access Memory (RAM), Dynamic Random Access Memory (DRAM), Static Random Access Memory (SRAM), flash, magnetic disk drive, and/or optical disk drive. The storage device 506 can include an internal storage device, and/or an attached storage device (including detachable and non-detachable storage devices), as non-limiting examples.

Program code to be loaded onto processor 502 to perform the various aspects described in this document can be stored in storage device 506 and subsequently loaded onto memory 504 for execution by processor 502. In accordance with various embodiments, one or more of processor 502, memory 504, and storage device 506 can store one or more of various items during the performance of the processes described in this document. Such stored items can include, but are not limited to, data regarding the various voting options, data indicating whether those options are in a selected or unselected state, and data indicating a rank of the selected options.

In some embodiments, memory inside of the processor 502 is used to store instructions and to provide working memory for processing. In other embodiments, however, a memory external to the processing device is used for one or more of these functions. The external memory can be the memory 504 and/or the storage device 506, for example, a dynamic volatile memory and/or a non-volatile flash memory.

Various elements of system 500 can be provided within an integrated housing, Within the integrated housing, the various elements can be interconnected and transmit data therebetween using suitable connection arrangement 508, for example, an internal bus as known in the art, wiring, cables, and/or printed circuit boards.

The system 500 can provide an output signal to various output devices, including a display 512, audio output 514 (which may include speakers and/or an interface for connection with speakers and/or headphone), ballot marking device 516 or other printing equipment, and other peripheral devices. The display 512 of various embodiments includes one or more of, for example, a touchscreen display, an organic light-emitting diode (OLED) display, a curved display, and/or a foldable display. The display 512 may be implemented using a monitor, a tablet, a laptop, a smartphone, or other device. The display 512 may be integrated with other components (for example, as in a smartphone), or separate (for example, an external monitor for a laptop).

Further input components in some embodiments include a keypad 518 which may be used as an alternative to or in addition to a touchscreen for user input. One or more scan heads 520, 522 may be used to capture an image of a ballot. An imprinter 524 may be used, for example, to print an identifier on a ballot. One or more drive motors 526 may be used to propel a ballot through the system, for example to propel the ballot past the scan heads 520, 522 and/or to align an appropriate portion of the ballot with the imprinter 524. One or more sensors (not illustrated) may be provided at various points along a paper path through the device to detect the presence and/or position of a ballot.

Other peripheral devices may include, in various examples of embodiments, assistive input devices including but not limited to sip-and-puff input devices.

In various embodiments, control signals are communicated among the components of the system 500 using any signaling or communications protocol that enables device-to-device control with or without user intervention. The output devices can be communicatively coupled with other components via dedicated connections and/or through other interfaces. One or more of the components can be integrated into a single unit with the other components of system 500. Alternatively, one or more of those components may be separate from one or more of the other components.

The embodiments can be carried out by computer software implemented by the processor 502 or by hardware, or by a combination of hardware and software. As a non-limiting example, the embodiments can be implemented by one or more integrated circuits. The memory 504 can be of any type appropriate to the technical environment and can be implemented using any appropriate data storage technology, such as optical memory devices, magnetic memory devices, semiconductor-based memory devices, fixed memory, and removable memory, as non-limiting examples. The processor 502 can be of any type appropriate to the technical environment, and can encompass one or more of microprocessors, general purpose computers, special purpose computers, and processors based on a multi-core architecture, as non-limiting examples.

The components of the system 500 may be powered through a power supply such as a connection to an AC outlet and/or a battery system. The battery may be rechargeable through the connection to the AC outlet and may have sufficient capacity to serve as a backup to allow for voting and tabulation to continue in the event of a power outage or other loss of AC power.

Various methods are described herein, and each of the methods comprises one or more steps or actions for achieving the described method. Unless a specific order of steps or actions is required for proper operation of the method, the order and/or use of specific steps and/or actions may be modified or combined. Additionally, terms such as “first”, “second”, etc. may be used in various embodiments to modify an element, component, step, operation, etc. Use of such terms does not imply an ordering to the modified operations unless specifically required.

Embodiments described herein may be carried out by computer software implemented by a processor or other hardware, or by a combination of hardware and software. As a non-limiting example, the embodiments can be implemented by one or more integrated circuits. The processor can be of any type appropriate to the technical environment and can encompass one or more microprocessors, general purpose computers, special purpose computers, and processors based on a multi-core architecture, as non-limiting examples.

When a figure is presented as a flow diagram, it should be understood that it also provides a block diagram of a corresponding apparatus. Similarly, when a figure is presented as a block diagram, it should be understood that it also provides a flow diagram of a corresponding method/process.

The implementations and aspects described herein can be implemented in, for example, a method or a process, an apparatus, a software program, a data stream, or a signal. Even if only discussed in the context of a single form of implementation (for example, discussed only as a method), the implementation of features discussed can also be implemented in other forms (for example, an apparatus or program). An apparatus can be implemented in, for example, appropriate hardware, software, and firmware. The methods can be implemented in, for example, a processor, which refers to processing devices in general, including, for example, a computer, a microprocessor, an integrated circuit, or a programmable logic device. Processors also include communication devices, such as, for example, computers, cell phones, portable/personal digital assistants ("PDAs"), and other devices that facilitate communication of information between end-users.

Reference to "one embodiment" or "an embodiment" or "one implementation" or "an implementation", as well as other variations thereof, means that a particular feature, structure, characteristic, and so forth described in connection with the embodiment is included in at least one embodiment. Thus, the appearances of the phrase "in one embodiment" or "in an embodiment" or "in one implementation" or "in an implementation", as well any other variations, appearing in various places throughout this disclosure are not necessarily all referring to the same embodiment.

As used herein, the singular forms "a," "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

Various hardware elements of one or more of the described embodiments may be implemented as modules that carry out (i.e., perform, execute, and the like) various functions that are described herein in connection with the respective modules. As used herein, a module includes hardware (e.g., one or more processors, one or more microprocessors, one or more microcontrollers, one or more microchips, one or more application-specific integrated circuits (ASICs), one or more field programmable gate arrays (FPGAs), one or more memory devices) deemed suitable for a given implementation. Each described module may also include instructions executable for carrying out the one or more functions described as being carried out by the respective module, and it is noted that those instructions could take the form of or include hardware (i.e., hardwired) instructions, firmware instructions, software instructions, and/or the like, and may be stored in any suitable non-transitory computer-readable medium or media, such as media commonly referred to as RAM, ROM, etc.

Although features and elements are described above in particular combinations, each feature or element can be used alone or in any combination with the other features and elements. In addition, the methods described herein may be implemented in a computer program, software, or firmware incorporated in a computer-readable medium for execution by a computer or processor. Examples of computer-readable storage media include, but are not limited to, a read only memory (ROM), a random access memory (RAM), a register, cache memory, semiconductor memory devices, magnetic media such as internal hard disks and removable disks, magneto-optical media, and optical media such as CD-ROM disks, and digital versatile disks (DVDs).

Other variations of the described embodiments are contemplated. The above-described embodiments are intended to be illustrative, rather than restrictive, of the present invention. The scope of the invention is thus not limited by the examples given above but rather is defined by the following claims.

The invention claimed is:

1. A method comprising:

receiving a marked ballot at a paper input of a scanning device;

while the ballot is at least partially in the scanning device:

scanning the ballot to obtain a digital image of the ballot; and receiving a ballot approval from a user;

in response to the ballot approval:

imprinting an identifier on the ballot;

storing data that associates the identifier with the digital image of the ballot; and after imprinting the identifier on the ballot, releasing the ballot through a paper output of the scanning device;

wherein the ballot is not re-scanned after the identifier is imprinted on the ballot and before the ballot is released.

2. The method of claim 1, further comprising, before receiving the ballot approval, providing to the user information derived from the digital image of the ballot.

3. The method of claim 2, wherein providing information derived from the digital image of the ballot comprises providing a visual or audio output of user selections identified in the digital image.

4. The method of claim 2, wherein providing information derived from the digital image of the ballot comprises displaying the digital image of the ballot on a screen.

5. The method of claim 1, wherein the ballot approval comprises a selection of a physical button, selection of a touch screen button, or a selection through an assistive input device.

6. The method of claim 1, wherein storing data that associates the identifier with the digital image of the ballot comprises overlaying an image of the identifier on the digital image of the ballot.

7. The method of claim 1, wherein storing data that associates the identifier with the digital image of the ballot comprises including the identifier in metadata of the digital image of the ballot.

8. The method of claim 1, wherein the scanning of the ballot begins while at least a portion of the ballot is outside of the paper input.

9. The method of claim 1, wherein the scanning device has a paper path between the paper input and the paper output, and wherein the paper path is shorter than a length of the ballot.

10. An apparatus comprising:

scanning optics positioned along a paper path;

an imprinter positioned along the paper path; and one or more processors configured to perform at least:

scanning a ballot with the scanning optics to obtain a digital image of the ballot;

receiving a ballot approval from a user;

in response to the ballot approval from a user, imprinting an identifier on the ballot;

storing data that associates the identifier with the digital image of the ballot; and after imprinting the identifier on the ballot, releasing the ballot through a paper output of the scanning device;

wherein the apparatus is configured not to re-scan the ballot after the identifier is imprinted on the ballot and before the ballot is released.

11. The apparatus of claim 10, wherein the paper path has a paper input, and wherein the imprinter is positioned along the paper path between the scanning optics and the paper output.

12. The apparatus of claim 10, further configured to provide to the user information derived from the digital image of the ballot before receiving the ballot approval.

13. The apparatus of claim 10, wherein the ballot approval comprises a selection of a physical button, selection of a touch screen button, or a selection through an assistive input device.

14. The apparatus of claim 10, wherein storing data that associates the identifier with the digital image of the ballot comprises overlaying an image of the identifier on the digital image of the ballot.

15. The apparatus of claim 10, wherein storing data that associates the identifier with the digital image of the ballot comprises including the identifier in metadata of the digital image of the ballot.

16. The apparatus of claim 10, wherein the scanning of the ballot begins while at least a portion of the ballot is outside of the paper input.

17. The apparatus of claim 10, wherein a length of the paper path is less than 350 mm.

* * * * *